Patented May 28, 1946

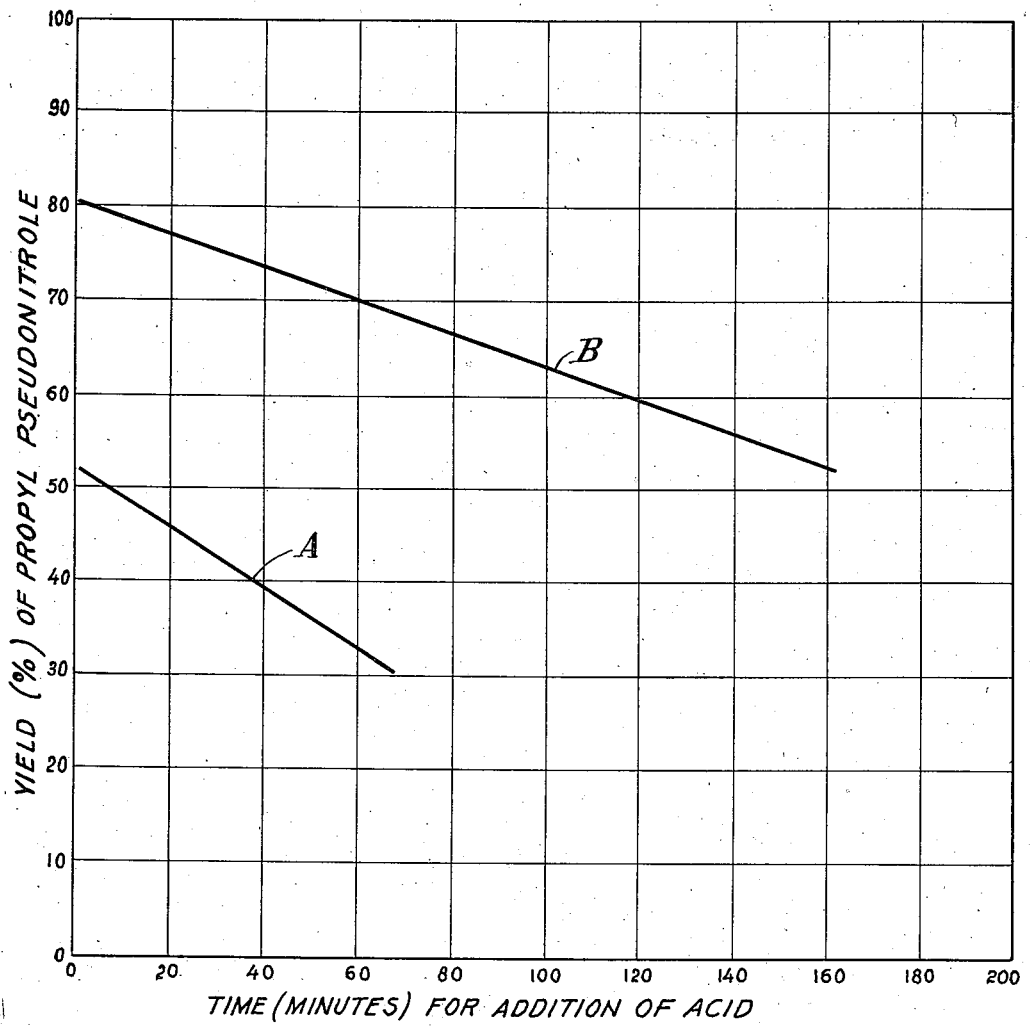

2,401,269

UNITED STATES PATENT OFFICE 2,401,269

PREPARATION OF NITROLIC ACIDS AND PSEUDONITROLES

Edwin M. Nygaard, Woodbury, N. J., and Thomas T. Noland, Richmond, Ky., assignors to Socony-Vacuum Oil Company, Incorporated, a corporation of New York Application February 13, 1945, Serial No. 577,723

14 Claims. (Cl. 260—500)

This invention has to do with an improved method for the preparation of nitrolic acids and pseudonitroles.

It has long been known in the art that nitrolic acids and pseudonitroles are prepared by reaction of nitrous acid with primary and secondary nitroparaffins, respectively. For example, a nitrolic acid, such as propyl nitrolic acid, is obtained from primary nitropropane (1-nitropropane), as illustrated by Equation I:

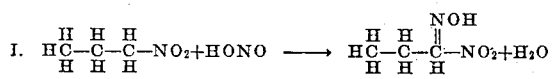

Similarly, a pseudonitrole, such as propyl pseudonitrole, is obtained from secondary nitropropane (2-nitropropane), as illustrated by Equation II:

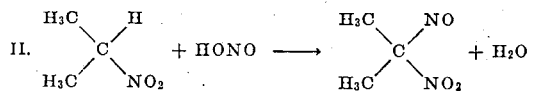

The foregoing reactions are usually carried out by dissolving a nitroparaffin—excepting $CH_3NO_2$—in aqueous alkali, then adding an inorganic nitrite and acidifying in the cold with a mineral acid. Another prior procedure involves the steps of dispersing a nitroparaffin in water, saturating the resultant dispersion with nitrous acid, making the solution strongly alkaline with an alkali metal hydroxide and then acidifying with a mineral acid. All of such methods, then, require nitrous acid, per se, or developed in the preparation from an alkali nitrite and a mineral acid.

In our copending application, Serial Number 489,066, filed May 29, 1943, with John H. McCracken, of which the present application is a continuation-in-part, we have described a novel method for preparing nitrolic acids and pseudonitroles from primary and secondary nitroparaffins, respectively, wherein it is unnecessary to use nitrous acid or its equivalent in the form of an alkali nitrite and mineral acid. This novel method is extremely simple and merely involves contacting a nitroparaffin with substantially a stoichiometrical amount of an aqueous alkali, thereafter acidifying the nitroparaffin-aqueous alkali mixture at a temperature below about 15° C. with a mineral acid other than nitrous acid, and then separating a nitrolic acid or a pseudonitrole from the reaction product so obtained.

We have now discovered that the efficiency of our method outlined above, and described in detail in the aforesaid application, is improved substantially by modifying the same, and it is upon this discovery that the present invention is predicated. The method contemplated herein involves the feature of adding a mineral acid other than nitrous acid to a nitroparaffin-aqueous alkali mixture or an aqueous mixture of a nitroparaffin salt at a rapid rate, with the temperature maintained below about 15° C. and followed by separation of a nitrolic acid or a pseudonitrole from the reaction product so obtained.

The rate of addition of the aforesaid acid to a nitroparaffin-aqueous alkali mixture or an aqueous mixture of a nitroparaffin salt should be rapid in order that maximum yields of nitrolic acids and pseudonitroles be realized. We have found that when the acid is added to the said mixture or salt mixture over an extended period, as several hours, yields of nitrolic acids and pseudonitroles are appreciably lower and the amount of nitroparaffin regenerated in the method becomes significant. In contrast to this, when the acid was added all at once or over a very short period, as several minutes or less, high yields of the desired products were obtained. It is preferred, as demonstrated by the curves in Figure 1, discussed hereinafter, that 0.22 mole of mineral acid other than nitrous acid be rapidly added to 0.2 mole of said nitroparaffin-aqueous alkali mixture or an aqueous mixture of a nitroparaffin salt during a period of less than 30 minutes, and particularly preferred are periods of less than 10 minutes.

In the present method other precautions should also be observed in order to achieve a high degree of efficiency; although, as aforesaid, the rapid rate of addition of mineral acid to a nitroparaffin-aqueous alkali mixture or an aqueous mixture of a nitroparaffin salt is the salient factor here. It is desirable, for example, to use a stoichiometrical quantity, or a slight excess, of a relatively strong alkali with the nitroparaffin reactant; however, a large excess of alkali is not conducive to the obtainment of good yields of the desired nitrolic acids and pseudonitroles. In this connection, when a 100 per cent excess of 30 per cent sodium hydroxide solution was used with 2-nitropropane, the yield of propyl pseudonitrole was very small. While various concentrations of aqueous alkali, as alkali metal hydroxides and alkaline earth metal hydroxides, may be used effectively in the present method, preferred for use are aqueous alkalies having concentrations from about 10 per cent to about 30 per cent. Relatively weak alkalies, such as ammonium hydroxide and organic amines, are not contemplated herein, inasmuch as they are apparently too weakly basic to produce the salts of the nitroparaffins necessary for reaction with said mineral acid. Accordingly, as used here and in the claims appended hereto, the language "relatively strong alkali" refers to an alkali metal hydroxide or an alkaline earth metal hydroxide, and thus refers to an alkali suitable for use in the present method. It will be apparent to those familiar with the art that the nitroparaffin contacted with aqueous alkali is converted to its corresponding salt and, therefore, it will also be apparent that an aqueous mixture of a salt of a nitroparaffin may be used as the starting material. In this connection, we have also found that aged mixtures of nitroparaffin and aqueous alkali, and aged aqueous mixtures of nitroparaffin salts, through some unknown behavior, give rise to greater yields of the corresponding nitrolic acids and pseudonitroles, than do freshly prepared nitroparaffin-aqueous alkali mixtures and aqueous mixtures of nitroparaffin salts. The nitroparaffin-aqueous alkali mixtures, and aqueous mixtures of nitroparaffin salts, may be aged by keeping the same at room temperature for several days or weeks or longer. This aging effect may also be influenced by heat, although the temperature should not be brought up to the decomposition temperature of the mixture or salt.

As indicated hereinabove, temperature plays an important role in our method. Temperatures both high and low, however, may be used when a nitroparaffin is contacted with an aqueous alkali; yet, temperatures of the order of 20-25° C. are preferred for this purpose. Particular care should be taken in the acidification procedure—that is, during the addition of a mineral acid other than nitrous acid to the nitroparaffin-aqueous alkali mixture or the aqueous mixture of a nitroparaffin salt—to maintain the temperature below about 15° C. In general, temperatures from about 0° C. to about 5° C. are preferred for the acidification operation. It has been found that if the temperature of the reaction mixture so formed is allowed to increase above about 20° C. during acidification, increasing amounts of nitrous oxide (N₂O) are produced and less nitrolic acid or pseudonitrole is found in the reaction product. In separating the nitrolic acid or pseudonitrole formed in the reaction from the reaction mixture, care must be taken that the temperature is maintained below the decomposition temperature of the said nitrolic acid or pseudonitrole, lest the yield thereof be lowered considerably. It will be apparent that the decomposition temperature will vary for the individual nitrolic acids and pseudonitroles obtained in the present method; however, it is preferred that the separation procedure be carried out at temperatures below about 15° C.

In the acidification operation, any mineral acid other than nitrous acid may be used; typical acids are hydrochloric, nitric and sulfuric. The concentration of such mineral acids may be varied considerably. It is preferred that the mineral acid have such a concentration that no appreciable heat is evolved when the acid is diluted with or added to water. The quantity of acid used may be varied over a relatively wide range, but it is desirable to use a slight excess of acid in the acidification step. As previously pointed out in our copending application, identified hereinabove, it is advantageous to keep added oxygen from the reaction mixture.

Since filing our above-identified application, analysis of our investigations indicates that a reaction mechanism other than the one there proposed most probably obtains. Our investigations point to the following mechanism which is illustrated by the preparation of propyl nitrolic acid from 1-nitropropane, being represented by Equation III below:

III.

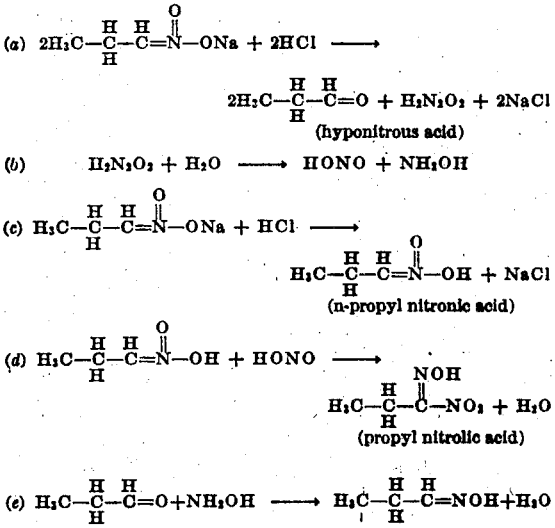

The overall reaction from Equation III, (a) through (e), may be represented by Equation III (f):

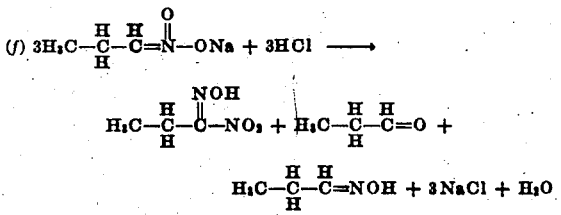

Following the same reaction mechanism, a secondary nitroparaffin such as 2-nitropropane is converted to propyl pseudonitrole as indicated in Equation IV below:

IV.

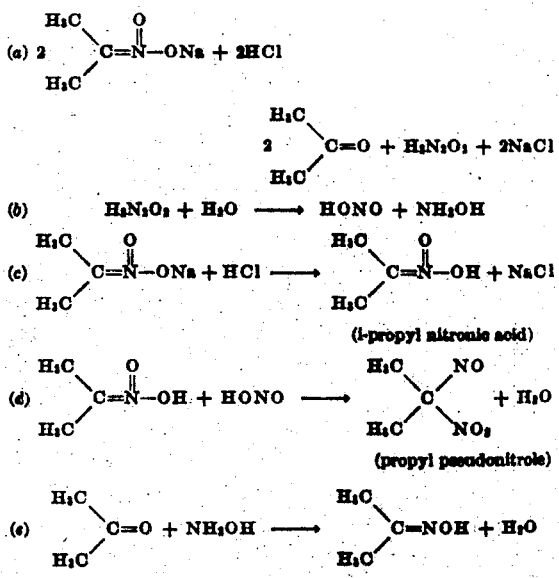

The overall reaction from Equation IV, (a)

through (e), may be represented by Equation IV (f):

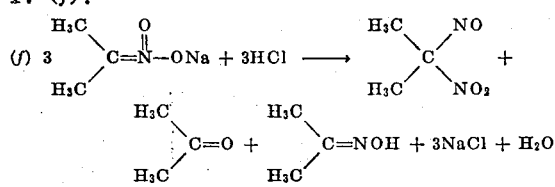

It is to be understood, however, that the foregoing proposed reaction mechanism is that which appears to obtain on the basis of present investigation; yet, it is not to be construed in any way as a limitation upon the method described herein and defined in the claims appended hereto.

To illustrate the effect of rate of addition of a mineral acid other than nitrous acid to a nitroparaffin-aqueous alkali mixture or an aqueous mixture of a niroparaffin salt, curves A and B in Figure I are provided. Curve A was obtained with a 2-nitropropane-10 per cent aqueous NaOH mixture aged for about 10 days at about 25° C.; curve B was obtained with a corresponding mixture aged for about 65 days under the same conditions. In obtaining the said curves, all reaction conditions were maintained substantially constant while the time of addition was varied. Concentrated HCl (20 cc., equivalent to 0.24 mole HCl) diluted with 6 volumes of water and cooled in an ice bath, were added to a solution of 0.20 mole of 2-nitropropane dissolved in 0.22 mole of NaOH (10% aqueous solution), the mixtures being constantly agitated. The reaction mixtures so obtained were agitated for about 45 minutes after complete addition of the acid. The temperatures during addition and during the following period were maintained below 5° C., the temperature range being from about −10° C. to 0° C. The reaction mixtures so obtained were then allowed to stand for about 16 hours in a cold room maintained at 1° C. All reaction products were blue solutions from which a cream colored solid precipitated. The solid was filtered onto a Büchner funnel, washed with water, dried on filter paper and weighed. In each case the solid was the dimeric form of propyl pseudonitrole. The pure dimer is colorless, melts to a blue liquid and then decomposes. When dissolved in organic liquids, such as benzene, carbon tetrachloride or acetic acid, a deep blue color is imparted to the organic liquids. This color change is believed to be the result of the dimer changing to the monomer. The melting point of the solid product is 75° C., and this is the value reported in the literature for propyl pseudonitrole. Curve A demonstrates the profound effect of the rate of addition; for example, when the addition was completed in about 1 minute, the yield was 52 per cent; contrasted with this is a typical addition period of about 70 minutes whereupon the yield was only 30 per cent. Curve B demonstrates the same effect, with complete addition in 7 seconds the yield was 80.1 per cent; lesser yields of 68 per cent and 52 per cent were obtained with complete addition in about 70 minutes and about 160 minutes respectively. Curve B, when compared with curve A, also demonstrates the much greater efficiency obtained with a 2-nitropropane-aqueous NaOH mixture aged for a considerable period.

It should be clear from the foregoing that the present method is a valuable means for preparing nitrolic acids and pseudonitroles. As is well known in the art, such compounds are valuable intermediates in chemical synthesis; and, recently, these compounds have been found to be extremely effective ignition improvers in Diesel-type fuels. It will also be apparent that the present method provides a means for obtaining appreciable yields of valuable chemicals, such as aldehydes, ketones and oximes.

The method contemplated herein is useful not only for the preparation of unsubstituted nitrolic acids and unsubstituted pseudonitroles, but is useful as well for the preparation of various substituted analogs. For example, halogen-substituted nitrolic acids and pseudonitroles may be prepared from their corresponding halogen-substituted primary and secondary nitroparaffins, respectively. In general, any substituent group such as halogen, keto, amino, hydroxyl, etc. may be present on the nitroparaffin reactant, and thus present on the resulting nitrolic acid or pseudonitrole, so long as the substituent group does not interfere with the formation of the alkali or alkaline earth metal salt of the nitroparaffin.

Although the present invention has been illustrated hereinabove by the preparation of specific nitrolic acids and pseudonitroles, it is to be understood that these specific embodiments are but representative of our improved method for the preparation of compounds of the broad classes of nitrolic acids and pseudonitroles. Accordingly, the present invention is not to be construed as limited thereto but is to be broadly construed in the light of the defining language of the appended claims.

We claim:

1. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali; adding a mineral acid other than nitrous acid to the mononitroparaffin-aqueous alkali reaction product so obtained, at a temperature below about 15° C. at a rapid rate; and separating said compound from the reaction mixture obtained in the preceding operation at a temperature below the decomposition temperature of said compound.

2. The method of preparation of a compound selected from the group consisting of a nitrolic acid and a pseudonitrole, which comprises: contacting a mononitroparaffin selected from the group consisting of a primary and a secondary mononitroparaffin with substantially a stoichiometrical amount of an aqueous alkali selected from the group consisting of an aqueous alkali metal hydroxide and an aqueous alkaline earth metal hydroxide; adding a mineral acid other than nitrous acid to the mononitroparaffin-aqueous alkali reaction product so obtained, at a temperature below about 15° C. at a rapid rate; and separating said compound from the reaction mixture obtained in the preceding operation at a temperature below the decomposition temperature of said compound.

3. The method of preparation of a compound selected from the group consisting of a nitrolic acid and a pseudonitrole, which comprises: contacting a mononitroparaffin selected from the group consisting of a primary and a secondary mononitroparaffin with substantially a stoichiometrical amount of an aqueous alkali metal hydroxide; adding a mineral acid other than nitrous acid to the mononitroparaffin-aqueous alkali reaction product so obtained, at a temperature below about 15° C. at a rapid rate; and separating said compound from the reaction mixture obtained in the preceding operation at a temperature below the decomposition temperature of said compound.

4. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali; aging the mononitroparaffin-aqueous alkali reaction product so obtained; adding a mineral acid other than nitrous acid to the said aged mononitroparaffin-alkali reaction product, at a temperature below about 15° C. at a rapid rate; and separating said compound from the reaction mixture obtained in the preceding operation at a temperature below the decomposition temperature of said compound.

5. The method of preparation of a compound selected from the group consisting of a nitrolic acid and a pseudonitrole, which comprises: adding a mineral acid other than nitrous acid at a rapid rate at a temperature below about 15° C. to an aqueous solution of a salt of a mononitroparaffin selected from the group consisting of a primary mononitroparaffin and a secondary mononitroparaffin, said salt being selected from the group consisting of an alkali metal salt and an alkaline earth metal salt; and separating said compound from the reaction mixture obtained in the preceding operation at a temperature below the decomposition temperature of said compound.

6. The method of preparation of a compound selected from the group consisting of a nitrolic acid and a pseudonitrole, which comprises: adding a mineral acid other than nitrous acid at a rapid rate at a temperature below about 15° C. to an aqueous solution of an alkali metal salt of a mononitroparaffin selected from the group consisting of a primary mononitroparaffin and a secondary mononitroparaffin; and separating said compound from the reaction mixture obtained in the preceding operation at a temperature below the decomposition temperature of said compound.

7. The method of preparation of a compound selected from the group consisting of a nitrolic acid and a pseudonitrole, which comprises: adding a mineral acid other than nitrous acid at a rapid rate at a temperature below about 15° C. to an aged aqueous solution of a salt of a mononitroparaffin selected from the group consisting of a primary mononitroparaffin and a secondary mononitroparaffin, said salt being selected from the group consisting of an alkali metal salt and an alkaline earth metal salt; and opertaing said compound from the reaction mixture obtained in the preceding operation at a temperature below the decomposition temperature of said compound.

8. The method of preparation of a compound selected from the group consisting of a nitrolic acid and a pseudonitrole, which comprises: adding a mineral acid other than nitrous acid at a rapid rate at a temperature below about 15° C. to an aged aqueous solution of an alkali metal salt of a mononitroparaffin selected from the group consisting of a primary mononitroparaffin and a secondary mononitroparaffin; and separating said compound from the reaction mixture obtained in the preceding operation at a temperature below the decomposition temperature of said compound.

9. The method of preparation of propyl pseudonitrole, which comprises: contacting 2-nitropropane with substantially a stoichiometrical amount of aqueous sodium hydroxide; adding a mineral acid other than nitrous acid to the 2-nitropropane-aqueous sodium hydroxide reaction product so obtained, at a temperature below about 15° C. at a rapid rate; and separating said propyl pseudonitrole from the reaction mixture obtained in the preceding operation at a temperature below about 15° C.

10. The method of preparation of propyl pseudonitrole, which comprises: contacting 2-nitropropane with substantially a stoichiometrical amount of aqueous sodium hydroxide; adding a mineral acid other than nitrous acid to the 2-nitropropane-aqueous sodium hydroxide reaction product so obtained, at a temperature below about 15° C. at a rate faster than that determined by the addition of substantially a 0.24 mole of hydrochloric acid to 0.2 mole of said 2-nitropropane-aqueous sodium hydroxide reaction product in about ten minutes; and separating said propyl pseudonitrole from the reaction mixture obtained in the preceding operation at a temperature below about 15° C.

11. The method of preparation of propyl pseudonitrole, which comprises: contacting 2-nitropropane with substantially a stoichiometrical amount of aqueous sodium hydroxide; aging the 2-nitropropane-aqueous sodium hydroxide reaction product so obtained; adding a mineral acid other than nitrous acid to the aged 2-nitropropane-aqueous sodium hydroxide reaction product, at a temperature below about 15° C. at a rapid rate; and separating said propyl pseudonitrole from the reaction mixture obtained in the preceding operation at a temperature below about 15° C.

12. The method of preparation of propyl pseudonitrole, which comprises: adding a mineral acid other than nitrous acid at a rapid rate at a temperature below about 15° C. to an aqueous solution of a salt of 2-nitropropane, said salt being selected from the group consisting of an alkali metal salt and an alkaline earth metal salt; and separating said propyl pseudonitrole from the reaction mixture obtained in the preceding operation at a temperature below the decomposition temperature of said propyl pseudonitrole.

13. The method of preparation of propyl pseudonitrole, which comprises: adding a mineral acid other than nitrous acid at a rapid rate at a temperature below about 15° C. to an aged aqueous solution of a salt of 2-nitropropane, said salt being selected from the group consisting of an alkali metal salt and an alkaline earth metal salt; and separating said propyl pseudonitrole from the reaction mixture obtained in the preceding operation at a temperature below the decomposition temperature of said propyl pseudonitrole.

14. The method of preparation of propyl nitrolic acid, which comprises: contacting 1-nitropropane with substantially a stoichiometrical amount of aqueous sodium hydroxide; adding a mineral acid other than nitrous acid to the 1-nitropropane-aqueous sodium hydroxide reaction product so obtained, at a temperature below about 15° C. at a rapid rate; and separating said propyl nitrolic acid from the reaction mixture obtained in the preceding operation at a temperature below about 15° C.

EDWIN M. NYGAARD.
THOMAS T. NOLAND.